US012698075B2

(12) United States Patent
Bonaccurso et al.

(10) Patent No.: US 12,698,075 B2
(45) Date of Patent: Aug. 4, 2026

(54) MULTIFUNCTIONAL THERMAL AND ACOUSTIC INSULATION SYSTEM FOR AN AIRCRAFT

(71) Applicants:Airbus Operations GmbH, Hamburg (DE); Airbus SAS, Blagnac (FR)

(72) Inventors: Elmar Bonaccurso, Taufkirchen (DE); Christian Thomas, Hamburg (DE); Alois Friedberger, Taufkirchen (DE); Wolfgang Machunze, Taufkirchen (DE); Andreas Helwig, Taufkirchen (DE); Tassilo Witte, Hamburg (DE)

(73) Assignees: Airbus Operations GmbH, Hamburg (DE); Airbus SAS, Blagnac (FR)

( * ) Notice: Subject to any disclaimer, the term of this patent is extended or adjusted under 35 U.S.C. 154(b) by 210 days.

(21) Appl. No.: 18/470,008

(22) Filed: Sep. 19, 2023

(65) Prior Publication Data

US 2024/0109642 A1 Apr. 4, 2024

(30) Foreign Application Priority Data

Sep. 29, 2022 (EP) ..................................... 22198874

(51) Int. Cl.
*B64C 1/40* (2006.01)
(52) U.S. Cl.
CPC ............ *B64C 1/40* (2013.01); *B64C 2220/00* (2013.01)
(58) Field of Classification Search
CPC ........ B64C 1/40; B64C 1/066; B64C 2220/00
See application file for complete search history.

(56) References Cited

U.S. PATENT DOCUMENTS 3,740,905 A * 6/1973 Adams ...................... B64C 1/40
244/119
5,169,700 A * 12/1992 Meier ........................ B64C 1/40
244/121
(Continued)

FOREIGN PATENT DOCUMENTS

DE 102013102612 A1 9/2014
DE 102016115994 A1 * 3/2018 ............... B64C 1/40
(Continued)

OTHER PUBLICATIONS

Mathur, G. P. et al. "Smart foam lined trim panels for aircraft cabin noise control," AIAA 2000-1916. 6th Aeroacoustics Conference and Exhibit. Jun. 2000. https://doi.org/10.2514/6.2000-1916 (Year: 2000).*
(Continued)

*Primary Examiner* — Richard Green
(74) *Attorney, Agent, or Firm* — Greer, Burns & Crain, Ltd.

(57) ABSTRACT
A multifunctional thermal and acoustic insulation system having a multilayer structure and a plurality of functional components formed integrally and non-exchangeably with the multilayer structure. The multilayer structure has a thermal and acoustic damping performance and comprises, in a stacked arrangement, a continuous first outer layer, a core layer and a continuous second outer layer. The core layer is between the outer layers so that the outer layers cover the core layer at least on opposite sides thereof. Functions of the functional components are related to at least one of the thermal and the acoustic damping performance of the multilayer structure and the functional components are provided on a first outer layer side of the core layer and/or on a second outer layer side of the core layer.

14 Claims, 3 Drawing Sheets

(56)     References Cited

U.S. PATENT DOCUMENTS

| | | | |
|---|---|---|---|
| 6,717,337 B2 * | 4/2004 | Howarth | H04R 17/00 |
| | | | 310/326 |
| 8,336,822 B2 * | 12/2012 | MacGregor | B64C 1/066 |
| | | | 244/119 |
| 8,376,262 B2 * | 2/2013 | Petitjean | B64C 1/40 |
| | | | 244/1 N |
| 10,724,227 B2 * | 7/2020 | Hegenbart | B64C 1/066 |
| 11,597,491 B2 * | 3/2023 | Guering | B64C 1/066 |
| 11,800,641 B2 * | 10/2023 | Levesque | B64C 1/066 |
| 2010/0252677 A1 | 10/2010 | Petitjean | |
| 2011/0211721 A1 | 9/2011 | Borgmann et al. | |
| 2016/0195072 A1 * | 7/2016 | Macaraeg | B64C 1/40 |
| | | | 60/527 |

FOREIGN PATENT DOCUMENTS

| | | | |
|---|---|---|---|
| DE | 102018113504 A1 | 12/2019 | |
| EP | 3696082 A1 | 8/2020 | |
| FR | 2918780 A1 | 1/2009 | |
| JP | 2005003777 A | 1/2005 | |

OTHER PUBLICATIONS

European Search Report for corresponding European Patent Application No. 22198874.4 dated Feb. 28, 2023.

* cited by examiner

MULTIFUNCTIONAL THERMAL AND ACOUSTIC INSULATION SYSTEM FOR AN AIRCRAFT

CROSS-REFERENCES TO RELATED APPLICATIONS

This application claims the benefit of European Patent Application Number 22198874.4 filed on Sep. 29, 2022, the entire disclosure of which is incorporated herein by way of reference.

FIELD OF THE INVENTION

The present invention relates to the field of thermal and acoustic insulation for an aircraft, such as a passenger aircraft or a helicopter.

BACKGROUND OF THE INVENTION

In particular, the invention deals with the constant assurance of thermal and acoustic comfort for passengers and crew members in an aircraft.

In an aircraft, various sources of noise emission create background noise in the areas occupied by people, such as a passenger cabin or a crew station. Said background noise may be considered a source of discomfort for the passengers and the crew. For example, said background noise may be external noise, e.g., noise originating from the engines and/or aerodynamic noise, and/or internal noise which may be linked to air conditioning and/or equipment ventilation systems.

A common solution for passively reducing the level of noise in an aircraft is employing materials having acoustic absorption properties, i.e., materials having the effect of reducing the intensity of sound waves by causing accelerated damping of said waves. Glass wool in the form of a blanket is one example for such materials which is known to be used in aircraft cabin walls between a structural lining of a fuselage and cabin delimiting panels. Such a blanket containing glass wool has a double function of thermal insulation and acoustic absorption.

However, at least certain frequencies, in particular low frequencies in the audible range, cannot be effectively absorbed with such a glass wool blanket. In fact, a large volume of absorbent materials would be necessary to provide for satisfying acoustic absorption. However, due to weight and volume restrictions on board an aircraft, a large volume of absorbent material is unacceptable.

A common solution for actively reducing the level of noise in an aircraft, known as ANC (Active Noise Control), consists in measuring the ambient noise and generating a cancelling noise by controlling the amplitude and phase of the cancelling noise. For generating the cancelling noise, actuators are arranged in the region in which a noise level is to be reduced. Said actuators then generate sound waves or vibrations of phase and intensity which reduce the level of sound energy or solid waves within objects by interference. However, subsequent installation of such actuators and the related wiring in an aircraft is an elaborate measure and might cause problems of mechanical interference with other equipment due to the limited installation space present and problems with increased weight. An ANC-system for an aircraft is known from US 2010/0252677 A1.

The inclusion of such an ANC-system in modular cabin panels already during manufacturing of the cabin panels is known from DE 10 2013 102 612 A1.

Moreover, DE 10 2018 113 504 A1 describes a sandwich structure component provided with wiring and recesses for receiving functional elements such as sensors and actuators of an ANC-system which allows an easy subsequent installation of an ANC-system within an aircraft equipped with such sandwich structure components.

However, a further problem to be dealt with in the field of aircraft insulation is the accumulation of condensed water within glass wool blankets. A soaked glass wool blanket has a significantly increased weight compared to a dry glass wool blanket, and the thermal and acoustic insulation properties of a soaked glass wool blanket are significantly decreased. Thus, also a soaked glass wool blanket is undesired on board an aircraft. As with the known glass wool blankets, water intake, especially in the form of water vapor, cannot be completely prevented, soaked glass wool blankets are to be checked at regular intervals for need of dehumidification or change in order to keep the aircraft weight as low as possible so as to balance flight economy and in order to ensure proper thermal and acoustic damping. Such necessity for regular check intervals significantly increases the maintenance effort.

SUMMARY OF THE INVENTION

Therefore, it is an object of the present invention to provide a thermal and acoustic insulation system for an aircraft which improves the thermal and acoustic comfort for passengers and crew members while only requiring a minimal installation effort, similar to the effort necessary for the installation of known glass wool blankets, and while only necessitating on-demand maintenance.

This object may be solved by the multifunctional thermal and acoustic insulation system for an aircraft as described herein, as well as an aircraft comprising said multifunctional thermal and acoustic insulation system.

The multifunctional thermal and acoustic insulation system as described in one or more embodiments is adapted for installation in an aircraft, such as, for example, a passenger aircraft or a helicopter. For installation, the system is adapted to be received between an inner surface of an aircraft primary structure, such as an aircraft fuselage structure, and a surface of a panel arrangement delimiting an aircraft cabin, the surface facing away from the aircraft cabin. Thus, the claimed system is adapted to replace blankets of glass wool commonly used in aircrafts to provide for thermal and acoustic insulation.

The system comprises a multilayer structure having a thermal and acoustic damping performance. The multilayer structure comprises a first outer layer, a core layer and a second outer layer. The multilayer structure comprises these layers in a stacked arrangement, wherein the core layer is received between the first and second outer layers so that the first and second outer layers cover the core layer at least on opposite sides thereof. The first and second outer layers are continuous layers. In other words, the first and second outer layers have surfaces not interrupted by any kind of cutout(s) or recess(es) of a size larger than fine perforation(s). Especially, as the functional components form integral parts of the multilayer structure, no layer of the multilayer structure comprises a recess for receipt of a functional component.

The system further comprises a plurality of functional components formed integrally and non-exchangeably with the multilayer structure.

The functional components are provided on a first outer layer side of the core layer and/or on a second outer layer side of the core layer. Preferably, the functional components are provided on the first and/or second outer layers.

The multilayer structure may comprise at least one intermediate layer provided between the core layer and at least one of the first and second outer layers. When comprising at least one intermediate layer, the functional components can be provided on the at least one intermediate layer, e.g. on a surface of the intermediate layer facing the core layer. As an alternative, the functional components can be provided sandwiched between the at least one intermediate layer and at least one of the first and second outer layers. It is conceivable that the intermediate layer is non-continuous, i.e., only is present in sections of the multilayer structure in which functional components are provided. The latter is for example the case, when the functional components are already provided on or integrally formed with the intermediate layer at an assembling step of the multilayer structure, and allows for very easy integration of the functional components into the multilayer structure as the intermediate layer sections provided with the functional components may be simply attached, such as stuck on or adhered to at least one of the first and second outer layers. Analogously to such an at least one non-continuous intermediate layer, i.e., intermediate layer section, the multilayer structure may comprise at least one section of an additional layer attached to at least one of the first and second outer layers at a surface facing away from the core layer.

In addition or as an alternative to the presence of at least one intermediate layer, at least one of the first and second outer layers may comprise multiple layers itself. Then, the functional components can be provided sandwiched between the multiple layers of the first and/or second outer layer.

It is also conceivable to use thin film deposition techniques for integration of functional components in the multilayer structure. Thereby, the functional component is formed as integral part of a layer of the multilayer structure. Known thin film deposition techniques which can be used are, for example, chemical vapor deposition and physical vapor deposition.

All of the above-described ways for integrating functional components in the multilayer structure or any desired combination thereof may be present in the multilayer structure. For example, at least one functional component may be provided:

- on the core layer-facing surface of at least one intermediate layer,
- on the core layer-facing surface of at least one of the first and second outer layers,
- sandwiched between an intermediate layer and at least one of the first and second outer layers,
- sandwiched between layers of the first and/or second outer layer, when comprising multiple layers, and/or
- as integral part of a layer of the multilayer structure.

When not yet installed in an aircraft, the multilayer structure preferably has a planar and flexible shape. A planar shape is herein understood to provide an extension in width and length directions which is respectively greater than an extension in a thickness direction. According to one embodiment, the length extension is greater than the width extension. According to another embodiment, the length extension is smaller than the width extension. For an ease of handling, the multilayer structure may comprise two or more modular panel-like sections of the stacked layer arrangement. The modular panel-like sections can be realized according to each of the previously described embodiments, wherein sections according to only one or both of said embodiments can be part of the multilayer structure. When comprising two or more modular panel-like sections, the functional components then are integrated in each modular panel-like section of the multilayer structure.

For the multilayer structure to be flexible, of course, each of its layers has to be flexible itself. Just as an example for the flexibility of the multilayer structure, the non-installed multilayer structure may be provided rolled up for an easy handling. When installed in an aircraft, the flexibility of the multilayer structure preferably allows conformation of the structure to a shape of the inner surface of an aircraft structure, such as the inner fuselage surface, with a high accuracy of fit. Generally, the multilayer structure preferably is adaptable in shape to a surface the system is to be attached. This allows for an installation taking as less space as possible.

At least one of the group comprising the first and second outer layers and, if present, the at least one intermediate layer (and further comprising, if present, at least one section of an additional layer as described above) can be a flexible foil. Needless to say, at least sections of the layers of the multilayer structure in which no functional components are present as well as the outermost surface of the multilayer structure are non-conductive.

The core layer preferably comprises acoustic and thermal insulation material, for example, glass wool.

As the core layer is provided sandwiched between the first and second outer layers, these first and second outer layers preferably protect the core layer from the surrounding environment of the multilayer structure and preferably also contribute to maintaining the core layer in a desired, especially planar and, e.g., blanket-like shape. Desirably, the first and second outer layers can protect the core layer from water—even though a complete prevention of water intake usually cannot be achieved. In view of preventing water intake into the multilayer structure to the extent possible, it can also be advantageous to provide at least one of the first and second outer layers and, if present, the at least one intermediate layer (and/or the at least one section of an additional layer as described above) with a hydrophobic coating. Of course, also an additional or alternative coating is conceivable, e.g. a coating enhancing the fire resistance of the multilayer structure. Moreover, to prevent water intake as best as possible, the core layer may not only be sandwiched between the first and second outer layers but may be completely enclosed, i.e., packed, by layers of the multilayer structure. Therefore, at edges of the multilayer structure, the first and second layers may be connected to provide a closed edge along the circumference of the multilayer structure, e.g. in a manner of a duvet cover for a blanket. Optionally, at least one further connecting layer is provided to extend around the circumference of the multilayer structure, the connecting layer having the shape of a band with parallel edges for connecting each of the parallel edges to a circumferential edge of each of the first and second outer layers, respectively, so as to enclose or pack the core layer in a manner of a box.

Functions of the functional components are related to at least one of the thermal and the acoustic damping performance of the multilayer structure. The functional components thus functionalize the multilayer structure to feature additional functions that go beyond the usual insulation function of the core layer and the covering and/or enclosing function as well as the protecting function of the first and second outer layers as described above.

To realize a functionality of the functional components over an entire width and length extension of the multilayer structure, the functional components are preferably integrated in a distributed manner, especially a substantially equally distributed manner, in the multilayer structure.

The functional components preferably are electronic or electrical components. Each electronic or electrical functional component may be a sensor, an actuator or an interconnection, such as an electrical interconnection, i.e., a conductor, or a data transfer interconnection. A sensor may especially be a microphone or other sensor for sound detection, a vibration sensor, a temperature sensor, a humidity sensor, a gas sensor, a conductivity sensor, a pH sensor or a sensor for corrosion monitoring. Of course, the functional components may comprise more than one sensor of one sensor kind but in addition or alternatively also different kinds of sensors. At least some of the sensors and associated electronics can be self-powered, i.e., need no wiring connection to a power supply. Such self-powering can be achieved by applying energy harvesting mechanisms. Data transfer is preferably also realized wirelessly. Thereby the elaborate installation of wiring and harnesses and also an increase of weight can be avoided. Such self-powering mechanism may be based on the thermoelectrical effect, vibration harvesting or harvesting of radio frequency (RF) radiation. However, there may also be a physically interconnection in the form of at least one conductive track provided on a layer surface of the multilayer structure, e.g. realized via metallization of the layer surface of the multilayer structure in the region of the conductive track(s). An actuator may especially be a generator of acoustic vibration and/or sound. If such generators are provided in the multilayer structure in a distributed manner, these can be used to allow overall ANC in the multifunctional thermal and acoustic insulation system and also surrounding environment. For example, the generators can generate sound counteracting a noise present in the surrounding environment of the insulation system and/or by contacting, in an installed position, an aircraft primary structure, such as the aircraft fuselage, or a cabin delimiting wall, to generate counteracting waves in the solid. In this latter example, the stimulation directions of the generators are directed towards the surrounding environment of the insulation system. However, it is also advantageous to position such generators so as to direct their stimulation output towards the core layer. Thereby, the generated sound and/or vibration is sent to the material of the core layer, e.g. glass wool, which has an influence on the acoustic insulation effect of the core layer. Thus, the sound and/or vibration can be generated in a way to increase the acoustic damping performance of the core layer, or even a wider damping frequency bandwidth range can be realized for the core layer material.

The functional components are preferably adapted to perform at least one of the following functions:

measurement of water intake into the multilayer structure and, especially, the core layer, analysis of the thermal and acoustic damping performance of the multilayer structure, stimulation of the multilayer structure and, especially, the core layer, in a manner to improve the acoustic damping performance of the multilayer structure, and stimulation of a surrounding environment in which the multifunctional thermal and acoustic insulation system is installed, in a manner counteracting a noise and/or a vibration present in the surrounding environment.

The provision of sensors, e.g. humidity sensors, can help to deal with the problem of water penetration into the multilayer structure. As discussed above, water penetration cannot be completely avoided so that more and more water accumulates within the multilayer structure during its lifetime, resulting in an increase of the overall weight of the insulation system. The sensors can measure the humidity within the multilayer structure and thereby support maintenance on demand to drain or replace the multilayer structure as required.

Moreover, distributed acoustic sensors, e.g. microphones, integrated into the multilayer structure can be effectively utilized to detect when the core layer is not fulfilling its acoustic insulation purpose properly anymore. Thereby, the acoustic sensors also support maintenance of the multilayer structure on demand as required.

Furthermore, distributed temperature sensor integrated into the multilayer structure can be effectively utilized to detect when the core layer is not fulfilling its thermal insulation purpose properly anymore. Thereby, also the temperature sensors support maintenance of the multilayer structure on demand as required.

Functions of the functional components can be controlled by one or more control units, preferably a single control unit. The multifunctional thermal and acoustic insulation system may comprise at least one connection point and/or at least one interface for connecting the system to the control unit(s). When the multilayer structure comprises modular panel-like sections, functional components of two adjacent modular panel-like sections may be interconnected to allow a joint control of all or at least one or more groups of the functional components of the multifunctional thermal and acoustic insulation system with one or more control units. Thereby, the necessity of connecting each modular panel-like section separately to a control unit can be avoided. For example, all functional components of the system may be controlled by a single control unit or each group of a number of groups into which the functional components may divided may be controlled by a separate control unit.

An aircraft described herein comprises an aircraft primary structure, such as an aircraft fuselage structure, and a panel structure delimiting an aircraft cabin. Further the aircraft comprises the above-described thermal and acoustic insulation system received between an inner surface of the aircraft primary structure and a panel structure surface facing away from the aircraft cabin.

In sum, the following positive effects can be achieved by the above-described multifunctional thermal and acoustic insulation system:

Multifunctionality is already considered during the design phase and implemented during the manufacturing phase so that various different functions usually realized by different components to be separately installed in an aircraft can be realized in a single common system to be installed in an aircraft.

The distributed integration of the functional components allows the overall system to benefit from the widespread functional effect of the components, which is a substantial improvement compared to the singular and stationary effect separately installed functional components commonly have.

By integrating all the functional components including wiring into the multilayer structure, when installing the system in an aircraft, the wiring and harnesses installation effort and also the weight that would be added with wiring and harnesses installation is reduced to a minimum. Due to the directly integrated functionality of the system, minor cables and installation bonding film, rivets and reinforcements are necessary.

Finally, as described above, the provided monitoring functionalities enable sophisticated maintenance concepts.

BRIEF DESCRIPTION OF THE DRAWINGS

A detailed description of an exemplary embodiment of the claimed multifunctional thermal and acoustic insulation system provided in an aircraft is given in the following with reference to the figures which show schematically:

DETAILED DESCRIPTION OF THE PREFERRED EMBODIMENTS

Figure 1:
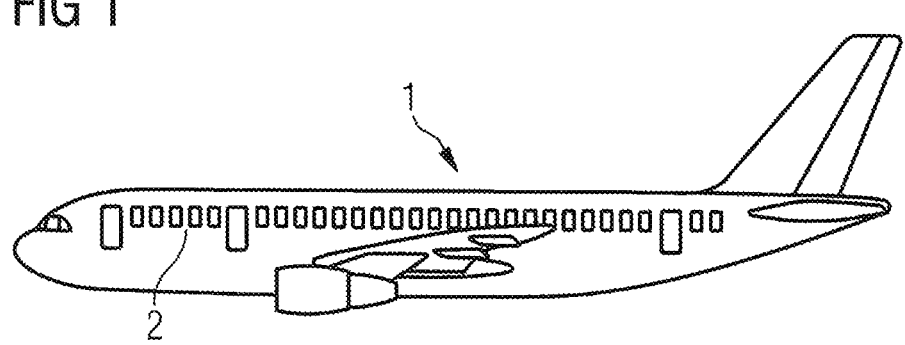
FIG. 1 a general view of an aircraft, in this case a civil transport jet airplane.

In FIG. 1, an aircraft 1, especially a civil transport jet airplane, having a fuselage 2 is shown.

Figure 2:
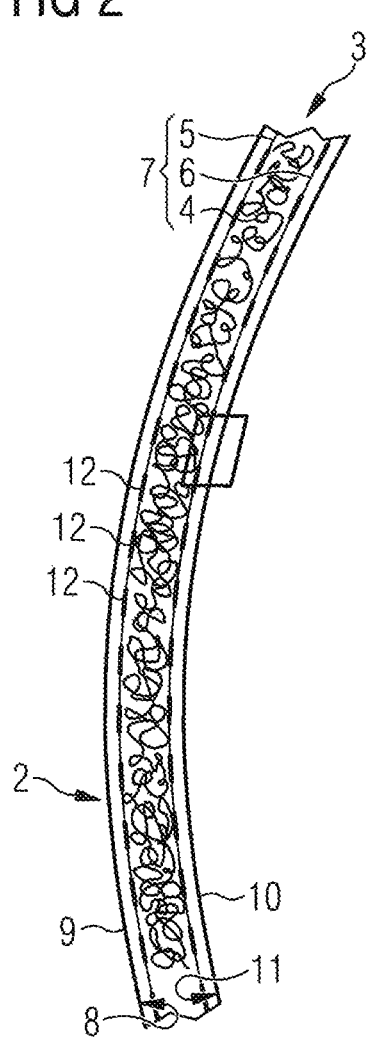
FIG. 2 a section of a cross-section through a fuselage of the aircraft of FIG. 1, illustrating a cross-section through the multifunctional thermal and acoustic insulation system installed in the aircraft.

As illustrated in FIG. 2, said aircraft 1 is provided with a multifunctional thermal and acoustic insulation system 3. Said multifunctional thermal and acoustic insulation system 3 is of the kind generally described in the foregoing. In the embodiment shown in FIG. 2, the multifunctional thermal and acoustic insulation system 3 comprises a core layer 4 of glass wool covered on opposite sides thereof by respective first and second outer layers 5, 6. Together, the core layer 4 and the first and second outer layers 5, 6 form a multilayer structure 7. In the installed position of the multifunctional thermal and acoustic insulation system 3 as shown in FIG. 2, the first outer layer 5 faces an inner surface 8 of an outer skin 9 of the aircraft fuselage 2, and the second outer layer 6 faces a cabin side wall 10 and especially a surface 11 of said cabin side wall 10 facing away from an aircraft cabin. Each of the first and second outer layers 5, 6 is a foil layer. A plurality of functional components 12 are shown as integrated parts of said first and second outer foil layers 5, 6 provided equally distributed within the foil layers 5, 6.

Figure 3A:
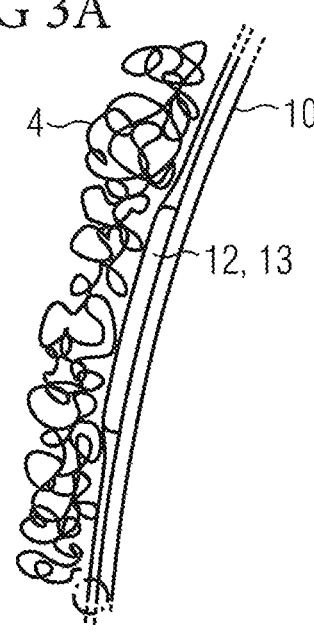
FIG. 3A a detailed cross-sectional side view of an enlarged section of the multifunctional thermal and acoustic insulation system of FIG. 2.
Figure 3B:
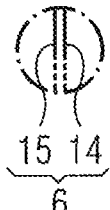
FIG. 3B a side view of a two-layer foil layer.
Figure 3C:
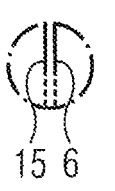
FIG. 3C a side view of a second layer as an intermediate layer.

FIG. 3A gives a detailed cross-sectional side view of an enlarged partial section of the multilayer structure 7 of FIG. 2, the partial section enlarged in FIG. 3A is marked by a box in FIG. 2. Said enlarged partial section shows a sensor 13 as one of the functional components 12 integrated in the second outer foil layer 6, wherein the foil layer 6 either is a two-layer foil (see FIG. 3B) and the functional component 12 is received in between the two layers 14, 15 of the second outer foil layer 6, or the second layer 15 shown in FIG. 3 is an intermediate layer of the multilayer structure 7 (see FIG. 3C) and the functional component 12 is received in between the second outer foil layer 6 and the intermediate layer 15.

8

Figure 4:
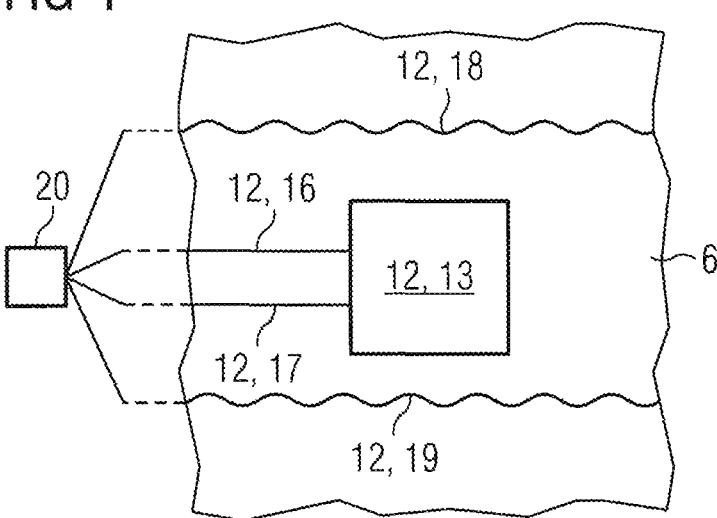
FIG. 4 a detailed front view of the enlarged section of FIG. 3A.

FIG. 4 gives a detailed front view of the enlarged partial section of FIG. 3A, wherein a section of the cabin side wall 10 present in the detailed cross-sectional side view of FIG. 3A is omitted. Thus, FIG. 4 shows a detailed front view of the enlarged partial section of the multilayer structure 7 of FIG. 3A. In addition to the functional component 12 integrated in the second outer foil layer 6, FIG. 4 shows further functional components 12, namely interconnections 16, 17 in the form of tracks extending to and from the sensor 13, e.g. to allow control signals to be sent to the sensor 13 and data signals to be received from the sensor 13. Said interconnections 16, 17 may also be received between the two layers 14, 15 of the second outer foil layer 6 analogue to the sensor 13. Two additional integrated tracks 18, 19 as further functional components 12 are shown in FIG. 4, which may also be received between the two layers 14, 15 of the second outer foil layer 6 analogue to the sensor 13, and which may function as electrical interconnections or data transfer connections to and/or from further functional components 12 not shown in FIG. 4. To provide for a joint control of the functional components 12, a single control unit 20 is provided connected to the functional components 12.

Figure 5:
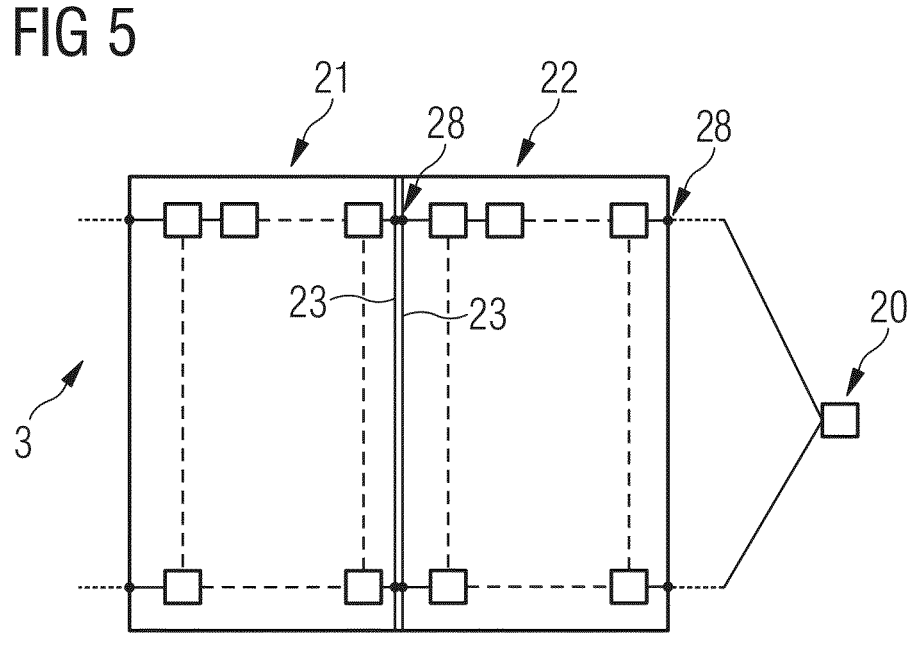
FIG. 5 a front view of two interconnected panel-like sections of the multilayer structure.

FIG. 5 shows an embodiment of the multifunctional thermal and acoustic insulation system 3 having two panel-like blanket sections 21, 22 functionally interconnected with one another at adjacent edges 23 of the blanket sections 21, 22 via interconnecting points 28. Any desired number of such panel-like blanket sections 21, 22 can be interconnected via adjacent edges so as to insulate any desired region of the fuselage 2. Via said interconnecting points 28, which may also serve as interfaces for connecting to the control unit 20, a joint connection of the functional components 12 of all said panel-like blanket sections 21, 22 with the single control unit 20 can be realized.

Figure 6:
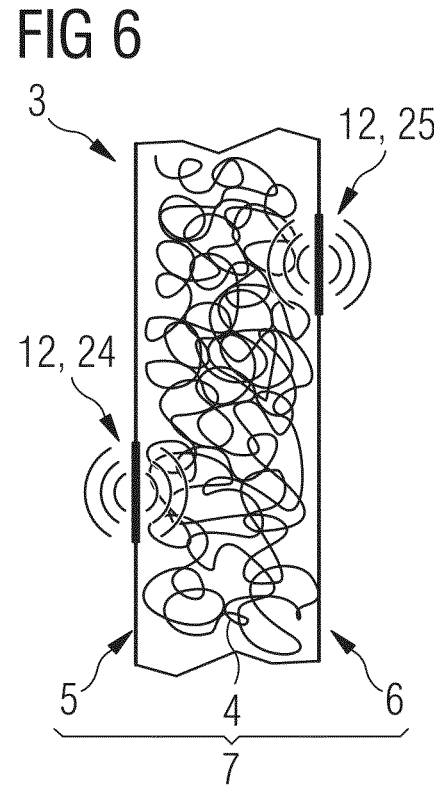
FIG. 6 another detailed cross-sectional side view of an enlarged section of the multifunctional and acoustic insulation system of FIG. 2, said enlarged section differing from the section of FIG. 3A.

Finally, FIG. 6 gives another detailed cross-sectional side view of an enlarged section of the multifunctional and acoustic insulation system 3 of FIG. 2, wherein said enlarged section differs from the section shown in FIG. 3A and the fuselage 2 as well as the cabin side wall 10 are omitted. The functional components 12 in the section shown in FIG. 6 are sound generators 24, 25. For active noise cancelling, a first sound generator 24 is shown integrated in the first outer layer 5. This first sound generator 24 is adapted to direct sound waves towards the fuselage 2 to counteract vibrations, i.e., solid waves, which may be present in the fuselage 2. Moreover, this first sound generator 24 within the first outer layer 5 is also adapted to direct sound waves towards the core layer 4 to improve its acoustic damping performance by increasing the damping frequency bandwidth range of the core layer 4. In addition, a second sound generator 25 is shown integrated in the second outer layer 6. This second sound generator 25 is adapted to direct sound waves towards the aircraft cabin. Said sound waves can counteract vibrations, i.e., solid waves, which may be present in the cabin side wall 10. Said sound waves however can also counteract noise present in the aircraft cabin. Moreover, also this second sound generator 25 within the second outer layer 6 is adapted to direct sound waves towards the core layer 4 to support the first sound generator 24 in improving the acoustic damping performance of the core layer 4 by increasing the damping frequency bandwidth range of the core layer 4. The directions in which the first and second sound generators 24, 25 output stimulation are illustrated by respective series of three ever-increasing arches originating from the first and second sound generators 24, 25, respectively.

The systems and devices described herein may include a control unit, controller, or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A multifunctional thermal and acoustic insulation system for an aircraft, the system configured to be received between an inner surface of an aircraft primary structure and a surface of a panel arrangement delimiting an aircraft cabin, the surface facing away from the aircraft cabin, and comprising:

a control unit, a multilayer structure having a thermal and acoustic damping performance and comprising, in a stacked arrangement, a first continuous outer layer, a core layer, and a second continuous outer layer, wherein the core layer is received between the first and second continuous outer layers so that the first and second continuous outer layers cover the core layer at least on opposite sides thereof, and a plurality of functional components formed integrally and non-exchangeably with the multilayer structure, wherein functions of the functional components are related to at least one of the thermal and the acoustic damping performance of the multilayer structure, wherein the functional components are provided on a first outer layer side of the core layer, on a second outer layer side of the core layer, or on both, wherein the multilayer structure comprises at least two adjacent modular panel sections of the stacked layer arrangement, wherein the functional components are integrated in each of the at least two adjacent modular panel sections, wherein the functional components of the at least two adjacent modular panel sections are interconnected via at least two interconnecting points disposed at different locations along adjacent edges of the at least two adjacent modular panel sections, such that the at least two interconnecting points are displaced from one another, to allow joint control of the interconnected functional components of the at least two adjacent modular panel sections via the control unit, and wherein each of the at least two adjacent modular panel sections are jointly controlled by the control unit, such that the control unit communicates with each of the at least two adjacent modular panel sections through one of at least two adjacent modular panel sections proximate to the control unit.

2. The multifunctional thermal and acoustic insulation system of claim 1, wherein the functional components are provided on the first continuous outer layer, on the second continuous outer layer, or on both.

3. The multifunctional thermal and acoustic insulation system of claim 1, wherein the multilayer structure comprises at least one intermediate layer provided between the core layer and at least one of the first and second continuous outer layers, or wherein at least one of the first and second continuous outer layers comprises multiple layers, or wherein the multilayer structure comprises at least one intermediate layer provided between the core layer and at least one of the first and second continuous outer layers and at least one of the first and second continuous outer layers comprises multiple layers.

4. The multifunctional thermal and acoustic insulation system of claim 3, wherein the functional components are provided on the at least one intermediate layer;

wherein the functional components are provided sandwiched between the at least one intermediate layer and at least one of the first and second continuous outer layers, or sandwiched between the multiple layers of one of the first and second continuous outer layers;

or both.

5. The multifunctional thermal and acoustic insulation system of claim 1, wherein the multilayer structure is flexible and adaptable in shape to a surface the system is to be attached to.

6. The multifunctional thermal and acoustic insulation system of claim 1, wherein at least one of the first and second outer layers is a flexible foil;

wherein at least one of the first and second outer layers has a coating; or both.

7. The multifunctional thermal and acoustic insulation system of claim 1, wherein the functional components are integrated in a distributed manner.

8. The multifunctional thermal and acoustic insulation system of claim 1, wherein the functional components are electronic or electrical components.

9. The multifunctional thermal and acoustic insulation system of claim 8, wherein the electronic or electrical components are components selected from a group consisting of: sensors, actuators, and interconnections.

10. The multifunctional thermal and acoustic insulation system of claim 1, wherein the functional components are configured to perform at least one of the following functions:

measurement of water intake into the multilayer structure, analysis of a thermal and acoustic damping performance of the multilayer structure, stimulation of the multilayer structure in a manner to improve an acoustic damping performance of the multilayer structure, and stimulation of a surrounding environment in which the multifunctional thermal and acoustic insulation system is installed, in a manner counteracting a noise, a vibration, or both present in the surrounding environment.

11. The multifunctional thermal and acoustic insulation system of claim 1, wherein the core layer comprises an acoustic and thermal insulation material.

12. The multifunctional thermal and acoustic insulation system of claim 1, wherein the core layer is completely enclosed by layers of the multilayer structure.

13. The multifunctional thermal and acoustic insulation system of claim 1, wherein no layer of the multilayer structure comprises a recess for receipt of a functional component.

14. An aircraft comprising:

an aircraft primary structure, a panel structure delimiting an aircraft cabin, and the multifunctional thermal and acoustic insulation system of claim 1, wherein the multifunctional thermal and acoustic insulation system is received between an inner surface of the aircraft primary structure and a panel structure surface facing away from the aircraft cabin.

* * * * *